J. S. ALSPAUGH.
AUTOMATIC GEAR SHIFT CONTROL.
APPLICATION FILED NOV. 14, 1917.
1,413,561.
Patented Apr. 25, 1922.
3 SHEETS—SHEET 3.
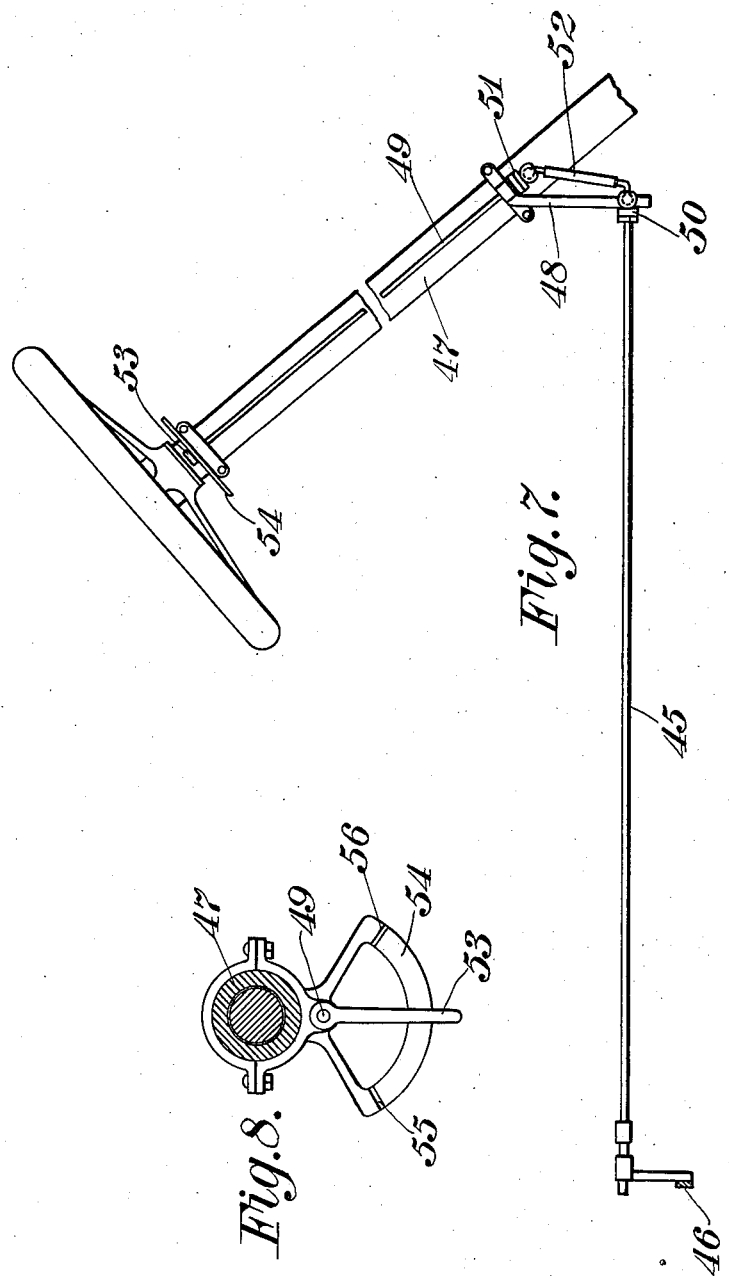
Inventor
James S. Alspaugh
By
His Attorneys

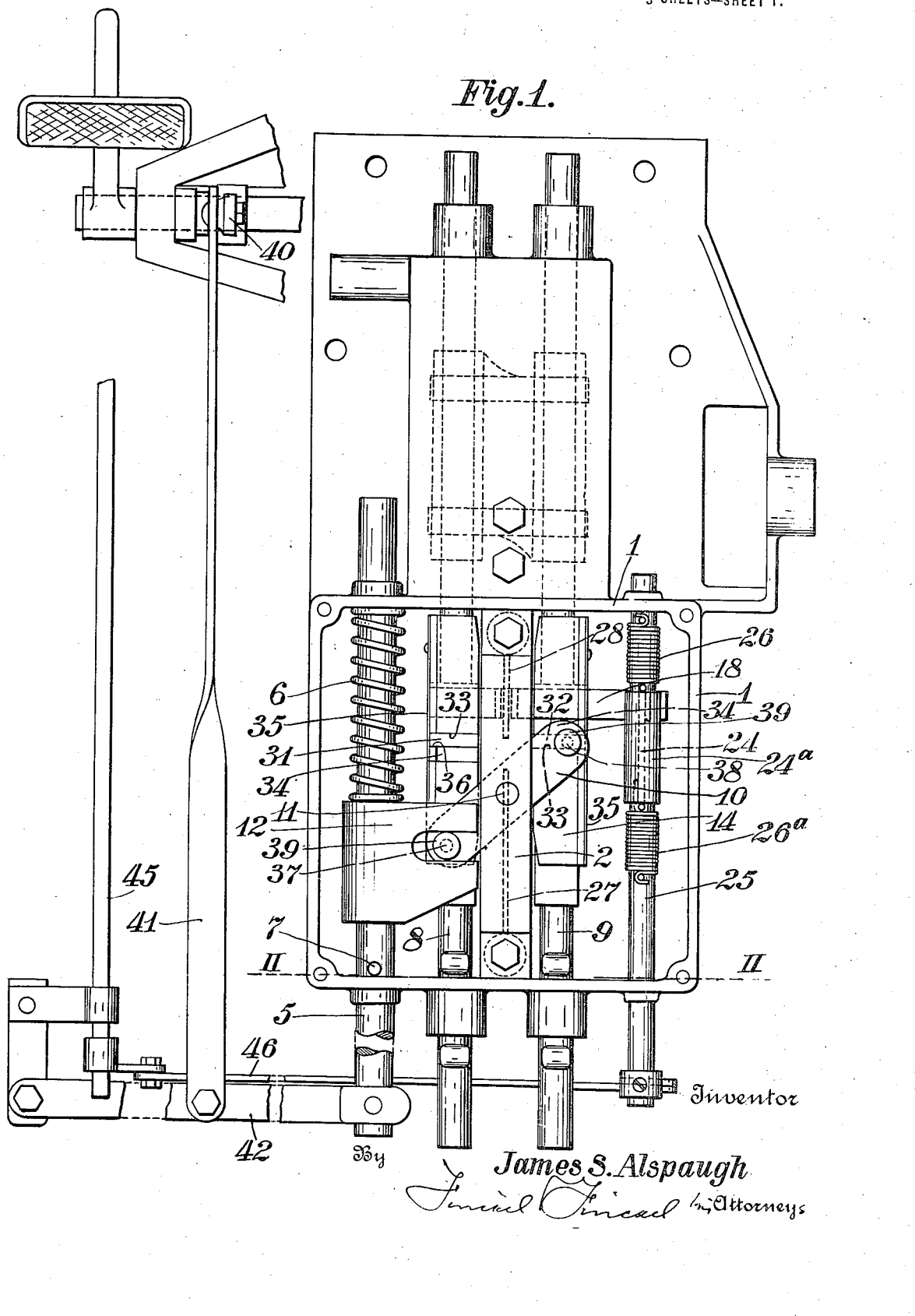

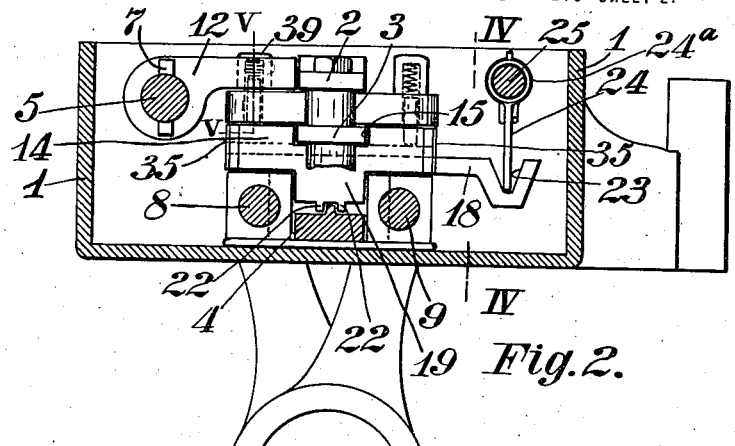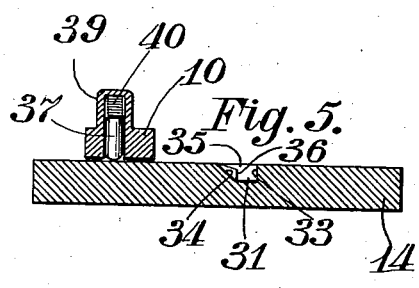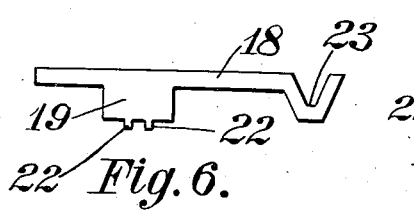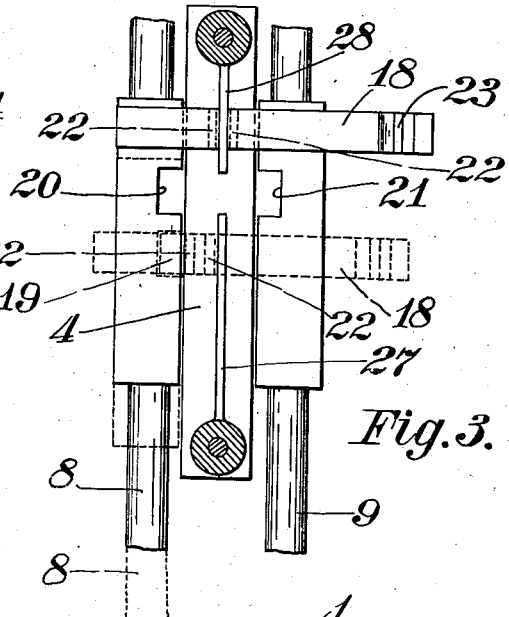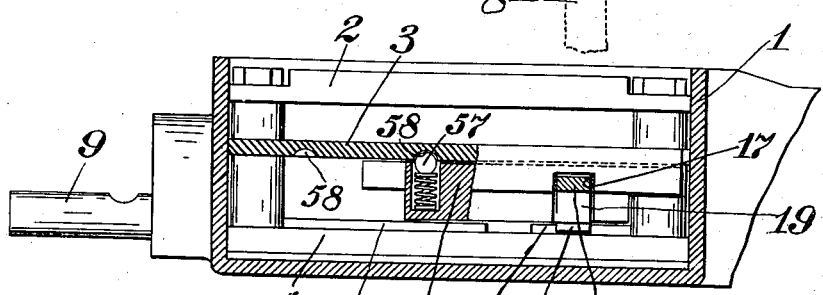

UNITED STATES PATENT OFFICE.

JAMES S. ALSPAUGH, OF PORTSMOUTH, OHIO.

AUTOMATIC GEAR-SHIFT CONTROL.

1,413,561. Specification of Letters Patent. Patented Apr. 25, 1922.

Application filed November 14, 1917. Serial No. 201,889.

*To all whom it may concern:*

Be it known that I, JAMES S. ALSPAUGH, a citizen of the United States, residing at Portsmouth, in the county of Scioto and State of Ohio, have invented a certain new and useful Improvement in Automatic Gear-Shift Controls, of which the following is a specification.

The present invention relates to the kind of mechanism shown and described in patent of the United States issued to me February 19, 1918, No. 1,257,064 and has for its object the improvement of such mechanism.

The invention also has for its object the provision of an improved automatic controlling device for shifting the gears of a transmission mechanism of an automobile or other machine, although useful for various other purposes, the construction being such that the transmission mechanism or the like is operated by the operation of the clutch lever, or other operating member in connection with springs or their equivalents, whereby the repeated operation of the operating member can be made to change the speed progressively or otherwise or to reverse the machine.

A further object of the invention is the provision in a controlling device of the nature indicated, of novel mechanical movements to enhance the utility and efficiency of the device.

Another object of the invention is the provision of novel means for alternately moving one member, first in one direction by the complete forward and backward movement of another member, and then in the opposite direction by the complete forward and backward movement of the second mentioned member, in order that the first mentioned member may be moved alternately in opposite directions during the movement of the second mentioned member in the same direction during its forward and backward movements.

A still further object of the invention is the provision of novel means for moving a plurality of members in different directions by the movement of another member, there being novel means for connecting the first and second mentioned members controlled at the will of the operator.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawings, wherein—

Figure 1 is a plan view of the device.

Fig. 2 is a transverse sectional view on the line II—II Fig. 1.

Fig. 3 is a detail sectional view of the gear shifting rods and latch therefore.

Fig. 4 is a sectional view on the line IV—IV of Fig. 2 with one of the gear shifting rods omitted and with parts broken out.

Fig. 5 is a longitudinal sectional detail view of the reciprocating plate on the line V—V Fig. 2.

Fig. 6 is a detail side view of the clutch bar.

Fig. 7 is a detail in side view illustrating the means for operating the clutch bar.

Fig. 8 is a plan view of the sector and also the handle for operating the means shown in Fig. 7.

In carrying out the invention, there is provided a suitable frame 1, which is of rectangular form as illustrated, and which is provided with the parallel longitudinal bars 2, 3 and 4 extending from one end to the other. An actuating rod 5 is slidable longitudinally through the ends of the frame at one side of the bar 2. Two longitudinal actuated rods—which can be gear shift rods—8 and 9 are slidable through the ends of the frame at either side of the bar 4, and the invention embodies a special operative connection between the rod 5 and the rods 8 and 9 for operating the latter by the operation of the former. The rod 5 can be operated in the forward direction by the automobile clutch lever 40ª connected thereto by rod 41 and lever 42 to move the rod 5 longitudinally, as seen in Fig. 1, against the tension of a spring 6, said spring moving the rod 5 in the reverse or rearward direction when the rod 5 is released. The spring 6 can be disposed within the frame 1 between one end thereof and a forked block 12 loose on the rod 5, the pin 7 being employed to engage the block when the block is pushed forward and the rearward position of the block being limited by the lug 39 as hereinafter explained. The rods 8 and 9 can be connected to the transmission mechanism (not shown) or other suitable appliance for controlling the same. For example, one of the rods 8—9, said rods being normally in intermediate or neutral position, when moved in one direction will provide first or low speed, and when moved in the opposite direction from intermediate position will provide for reverse motion, while the other rod in being moved in opposite direction will provide second or intermediate speed and third or high speed, so that by reciprocating the rods 8 and 9 in opposite directions from their neutral position, the transmission mechanism can be controlled.

An oscillatory member 10 is mounted between the bars 2 and 3 upon a pivot pin 11 engaged through said bars and oscillatory member and is operatively connected with the reciprocatory rod 5, whereby the reciprocation of said rod imparts an oscillatory movement to the member 10. The fork of the block 12 engages the hollow pin or lug 39 extending from one end of the oscillatory member 10, said pin and oscillatory member limiting the rearward position of the block 12.

A reciprocatory slide or plate 14 having a groove 15 is actuated by the member 10, said plate being movable longitudinally within the frame between bars 3 and 4. This slide 14 carries means for connecting it to either of the rods 8 and 9, and for this purpose, the slide 14 has a transverse channel or slot 17 in which a transverse clutch or latch bar 18 is slidable. The clutch bar 18 is provided with a lug 19 projecting between the rods 8 and 9 to alternately engage notches 20 and 21 with which the respective rods 8 and 9 are provided. The lug 19 has tongues 22 projecting downward therefrom. When the bar 18 is moved in one direction the lug 19 is adapted to enter the notch 20 to cause the rod 8 to move with the slide 14, and when the bar 18 is moved in the other direction, the lug 19 enters the notch 21 so that the rod 9 will move with the slide.

As a means for moving the latch bar 18 in one direction or the other, said bar is provided at its end with a recess or hook 23 engaged by a plate or feather 24 on a sleeve 24ª loose on a rocker shaft 25. This plate or feather 24 is made sufficiently long to permit the bar 18 to be carried back and forth by the plate 14 without becoming disengaged therefrom. The shaft 25 has connected to it one of the ends of each of two springs 26 and 26ª, while the other ends of said springs rest with equal or no pressure in normal position upon opposite sides of the feather 24 so that when the shaft 25 is rocked in either direction from the normal or neutral position one of said springs is placed under tension tending to press the feather and bar 18 to normal or neutral position.

As a means for holding the latch bar 18 toward one side or the other after being moved by the rock shaft 25 longitudinal rails 27 and 28 are provided on the bar 4. These rails are alined with each other with a space between them. The tongues 22 normally straddle and move over the rails when the bar 18 is in intermediate position. When the rods 8 and 9 are in intermediate position, their notches 20 and 21 are at opposite sides of the space between the adjacent ends of the rails 27—28. Thus, as the slide 14 is moved, the bar 18 is carried with it and when the lug 19 is opposite the space between the rails the bar can be thrown to engage either of the notches 20—21, but if the shaft 25 is not rocked the bar 18 will remain in intermediate position, the tongues 22 riding on one or the other of the rails according to the direction in which the slide 14 is moved.

Where the mechanism is to be used in connection with an automobile for the purpose of shifting gears it is important that means be provided whereby the shaft 25 may be rocked by means within quick and convenient reach of the driver. For this purpose I install under the foot board of the automobile a rock shaft 45 parallel with the shaft 25 and provide each of these shafts with a crank arm that is connected by a link rod 46. The shaft 45 is extended forward to near the steering post 47 where it is supported in a bracket 48 secured on the post. Another rock shaft 49 is mounted on and parallel to the steering post and connecting cranks 50 and 51 on the shafts 45 and 49 respectively is a link 52. The connection between the cranks 50 and 51 and link 52 is of the ball and socket variety. The upper end of the rock shaft 49 just below the steering wheel is provided with an operating handle 53, and secured on the steering post is a cooperating sector 54 provided with notches at 55—56 whereby when the handle 53 is moved to rock the shafts 45 and 46 and therefore set the spring 26 or 26ª it may be latched in that position until a change to the intermediate or other extreme position is desired.

A special operative connection between the member 10 and slide 14 is provided whereby when the rod 5 is moved a complete stroke forward and backward one time, the slide 14 is slid in one direction, and when said rod 5 is moved similar strokes forward and backward the second time, the slide 14 is moved in the opposite direction. In other words, as the rod 5 is moved completely forward by the clutch, the slide 14 is moved in one direction, either backward or forward, due to the operative connection between the member 10 and slide 14, the rearward movement of the block 12 under the influence of the spring 6 setting the member 10 and the appropriate latch for the next reverse movement of the slide 14. Thus the slide 14 is provided in its face adjacent to its opposite side edges with transverse recesses 31 and 32, each having a square shoulder 33 and an opposite beveled surface 34, said shoulder and surface of the two recesses being in reversed position. The slide 14 has leaf springs 35 attached to its opposite edges closing the ends of the recesses 31 and 32. Said recesses 31—32 each has an auxiliary shoulder 36 to form an abutment for the end of the latch when the latter is seated in the recess which compels a completion of the stroke of the plate 14 before the engaged latch can be removed. In other words the function of the auxiliary shoulder 36 is to prevent the accidental escape of the latch from the recess (31 or 32) when only a partial stroke of the member 12 is made. The springs 35 extend across the outer ends of the recesses 31—32 and are adapted to be sprung away from the ends of the recesses 31—32. The latches or latch pins 37—38 referred to are carried by the member 10 at opposite ends thereof, said latches being slidable within hollow pins or lugs 39 connected with the member 10, expansion springs 40 being confined within said pins or lugs 39, said springs tending to project said latches against the slide 14. The latches 37 and 38 are adapted to snap alternately into recesses 31 and 32, respectively, and as the slide 14 is completely reciprocated one of the latches slides over the spring 35 without entering the recess at its side when the opposite latch is operating the slide. Thus, with the parts arranged as shown in Fig. 1, with the latch 38 projected into the recess 32, when the rod 5 is moved forward by the clutch lever the latch 38 engages the shoulder 33 of the recess 32 and will move plate 14 rearward, the latch 37 passing over the edge of its companion spring 35. Then, when the rod 5 is released so as to be moved rearward under the influence of the spring 6, the slide 14 will remain stationary and the latch 38 will ride out of the recess 32 and up the inclined surface 34 onto the face of the plate 14, the latch 37 upon the completion of this movement of the member 10 dropping into the recess 31 ready for another operation of the clutch lever. During said rearward movement of the latch 38 and slide 14 the latch 38 was pressed against the spring 35 and bowed it outward as the parts passed the intermediate position, while the latch 37 which moved forward rode over the edge of the spring 35 without entering the recess 31 as before stated. When the rod 5 is moved forward the second time by the clutch lever the latch 37 engages the shoulder 33 of the recess 31 moving the slide 14 forward bowing out its companion spring 35, the pin 38 riding over the edge of its companion spring 35 and the parts upon the second reaction of the spring 6 resuming the position shown in Fig. 1. The cycle of movements of the member 10 and slide 14 is thus completed, it being generally noted that in the normal operation of the parts the forward movement of the rod against the spring 6 moves the slide 14 in one direction or the other while the return movement of the rod under the influence of the spring withdraws one latch and reseats the other latch for actuating the slide.

The operation of the latches on the slide 14 is the same whether the latch bar 18 be coupled with the rod 8 or 9, that is successive full forward movements of the rod 5 cause reciprocatory movements of the slide 14. By shifting the latch bar 18 from its neutral position to the notch 20 or 21 or from one of said notches 20 or 21 to the other either the rod 8 or 9 may be operated as desired.

The slide 14 can be provided with slip latch in the form of a spring held ball 57 to engage one or the other of two sockets 58 when said slide is in its forward or rearward position to prevent it from slipping out of position except when intentionally actuated.

In practice and assuming that the mechanism is for use in that type of gear shifting mechanism in which there are three speeds forward and a reverse the operation is as follows: As shown in Fig. 1 the bar 8 represents that used for obtaining the low speed and for the reverse, while the bar 9 represents that used for obtaining the intermediate speed and the third or high speed. In said Fig. 1 the parts are shown as being in the neutral but operative position. To operate the mechanism to shift the gears into low the handle 53 (Fig. 8) is turned to the left as viewed in said figure so as to place the spring 26 under tension. If now the bar 5 which is actuated by the clutch lever be pressed forward the plate 14 is thrown rearward but when during this rearward movement the clutch 18 alines with the opening between the rails 27—28, said clutch bar 18 is thrown to the left to engage and be locked with the notch 20 of the bar 8 thereby shifting that bar and throwing the gear into low. The bar 9 is left lying in the neutral position in this rearward movement of the plate 14. Upon the release of the clutch lever after this operation the block 12 under the action of spring 6 restores the oscillatory member 10 to its original position but without actuating the plate 14 during this movement. In this last operation the latch 38 rises out of its groove 32 and the latch 37 drops into its groove 31 upon the completion of the stroke. The mechanism is now in position for shifting the gears into reverse, and this can be effected by again throwing the clutch lever and bar 8 forward without changing the position of the lever 53, Fig. 8. Assuming, however, that a shift to reverse is not desired and that it is desired to shift from the low to second or intermediate the lever 53 is shifted to the extreme right (as viewed in Fig. 8) thereby relieving the latch bar 18 of the stress of the spring 26 and placing on said latch bar 18 the stress of the spring 26ª thus exerting a pull to the right on said latch bar 18 against the rail 27. Upon then giving a full stroke to the clutch lever the plate 14 is carried forward and with it the bar 8 and clutch bar 18, but when the lug 19 of the clutch bar 18 in this operation alines with the opening between the rails 27—28 it is instantaneously shifted into engagement with the notch 21 of the rod 9 and locked by the rail 28. In this forward movement the rod 8 is left in neutral position and the rod 9 carried forward to intermediate or second speed position. The rails 27 and 28 lock the clutch bar 18 in engagement with rods 8 and 9 notwithstanding action or inaction of the springs 26 and 26ª after the latch member 18 has been moved out of neutral position. After making this last described shift the spring 6 upon the release of the clutch lever reacts as before thereby again restoring the lever 10 to normal position with the latch 37 disengaged from its notch 34 and the latch 38 engaged with its notch 32. To shift the gears into high or third speed position the lever 53 is left in the position last described and the clutch lever pushed a full stroke forward thereby shifting rearward the plate 14 the clutch bar 18 and rod 9. To put both rods 8 and 9 into neutral position the handle 53 is turned to its middle or neutral position. When the clutch lever is then shoved forward only enough pressure by the spring then in tension is exerted on the latch bar 18 to throw it between the adjacent ends of the rails 27—28 and in position to cause the tongues 22 to straddle one of said rails when the slide 14 is moved in either direction and according to the direction in which the clutch lever is moved. Any operation of the clutch lever when the clutch bar is in the last described position has no effect on the rods 8 and 9. Only a full operation causes a full operation of the plate 14 and the setting of an operative latch. The slide 14, because of the auxiliary shoulders 36, may, of course, be moved back and forth less than a whole stroke and within the limits of the stroke without altering the effective engagement of the operating latch and from this it follows that the latch bar 18 can be shifted from one bar 8 or 9 to the other and such other bar operated from neutral position in either direction. For example the gear can be shifted directly from second or intermediate speed into reverse or from third or high speed into low. In such case the spring 6 should be strong enough to actuate the parts.

When the mechanism is employed in connection with the speed changing gearing of an automobile it is desirable that the clutch lever shall have some play to separate the clutch members without operating block 12 hence the pin 7 can be located in the rod 5 to stand normally removed in its rearmost position from the said block 12 so that some forward motion may be given the rod 5 before said pin 7 actuates the block 12, it being borne in mind that the member 10 with the slide 14 limits the rearward movement of the block 12.

What I claim is:

1. In means of the character described, the combination of a slide, an oscillatory member, means for oscillating the same, a pair of latches between the slide and the oscillatory member to move the slide in opposite directions by successive oscillations of the oscillatory member in the same direction, two members to be operated by said slide, a latching device for connecting either of said members with said slide and spring means adapted to be placed under tension to actuate said latching device in different directions to connect the slide and the aforesaid members to be operated by said slide.

2. In means of the character described, the combination of a slide, an oscillatory member, means for oscillating the same, a pair of latches between the slide and the oscillatory member to move the slide in opposite directions by successive oscillations of the oscillatory member in the same direction, two members to be operated by said slide, a latching device for connecting either of said members with said slide and spring means adapted to be placed under tension to actuate said latching device in different directions to connect the slide and the aforesaid members to be operated by said slide, said spring means also adapted normally to hold said latching device yieldingly in an intermediate position.

3. In means of the character described, the combination of a slide, an oscillatory member, means for oscillating the same, a pair of latches between the slide and the oscillatory member to move the slide in opposite directions by successive oscillations of the oscillatory member in the same direction, two members to be operated by said slide, a latching device for connecting either of said members with said slide, spring means adapted to be placed under tension to actuate said latching device in different directions to connect the slide and the aforesaid members to be operated by said slide and means for preventing the operation of said latching device except when the slide is in an intermediate position.

4. A gear shifting mechanism for a motor vehicle including in combination a slide, an oscillatory member, means for oscillating the same, a pair of latches between the slide and the oscillatory member to move the slide in opposite directions by successive oscillations of the oscillatory member in the same direction, two members to be operated by said slide, a latching device for connecting either of said members with said slide and spring means adapted to be placed under tension to actuate said latching device in different directions to connect the slide and the aforesaid members to be operated by said slide and means extending from and operative at the steering wheel of the motor vehicle for placing said spring means under tension.

5. In means of the character described, the combination of a slide, an oscillatory member, means for oscillating the same, a pair of latches between the slide and the oscillatory member to move the slide in opposite directions by successive oscillations of the oscillatory member in the same direction, two members to be operated by said slide and a latching device for connecting with the slide either of said members to be operated, spring means tending to shift said latching device into either of said connections, setting devices for said spring means, and means for preventing the operations of said latching device except when the slide is in an intermediate position.

6. In means of the character described, the combination of a slide, an oscillatory member, means for oscillating the same, a pair of latches between the slide and oscillatory member to engage the slide to cause the movement thereof in opposite directions by successive operations of the oscillatory member in the same direction, and means for preventing the disengagement of an engaged latch except at the limit of the stroke of the slide, substantially as described.

7. Means for operating the speed changing gearing of a motor vehicle including, in combination, a clutch operating lever, a gear shifting mechanism including a slide and an oscillatory member actuated by said lever, said clutch lever having a portion of its stroke inoperative as to said oscillatory member to permit the release of the clutch, and a pair of latches between the slide and oscillatory member to engage and move the slide in opposite directions by successive oscillations of the oscillatory member in the same direction.

8. Means for operating the speed changing gearing of a motor vehicle including, in combination, a clutch operating lever, a gear shifting mechanism including a slide and an oscillatory member actuated by said clutch lever, said lever having a portion of its forward stroke inoperative on said oscillatory member to permit the release of the clutch, said oscillatory member to engage and move the slide in opposite directions by successive oscillations of the oscillatory member in the same direction.

9. In a motor vehicle having a change speed gearing and a clutch and clutch operating lever, the combination of means for operating the change speed gearing including a slide, an oscillatory member therefor operated by the clutch lever to actuate the same by a forward stroke and a spring for moving the same in the rearward direction, a portion of the forward stroke of the clutch lever being inoperative on said oscillatory member, a pair of latches between the slide and oscillatory member to engage and move the slide in opposite directions by successive oscillations of the oscillatory member in the same direction.

JAMES S. ALSPAUGH.